（12）United States Patent
Yang

(10) Patent No.: US 11,403,604 B2
(45) Date of Patent: Aug. 2, 2022

(54) BLOCKCHAIN-BASED SET EXCHANGE METHOD AND APPARATUS FOR AVAILABLE RESOURCE QUOTAS

(71) Applicant: ADVANCED NEW TECHNOLOGIES CO., LTD., Grand Cayman (KY)

(72) Inventor: Xinying Yang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 85 days.

(21) Appl. No.: 16/894,881

(22) Filed: Jun. 8, 2020

(65) Prior Publication Data

US 2020/0302411 A1 Sep. 24, 2020

Related U.S. Application Data

(63) Continuation of application No. PCT/CN2019/075785, filed on Feb. 22, 2019.

(30) Foreign Application Priority Data

Jun. 13, 2018 (CN) .......................... 201810610225.7

(51) Int. Cl.
*G06Q 20/06* (2012.01)
*G06Q 20/12* (2012.01)
(Continued)

(52) U.S. Cl.
CPC ..... *G06Q 20/0658* (2013.01); *G06Q 20/1235* (2013.01); *G06Q 20/3678* (2013.01); *G06Q 20/405* (2013.01); *H04L 9/0637* (2013.01)

(58) Field of Classification Search
CPC ........... G06Q 20/0658; G06Q 20/1235; G06Q 20/405; G06Q 20/3678; H04L 9/0637
(Continued)

(56) References Cited

U.S. PATENT DOCUMENTS 5,592,376 A * 1/1997 Hodroff ................. G06Q 20/00
705/14.36
7,545,761 B1 * 6/2009 Kalbag ................... H04L 12/14
370/310
(Continued)

FOREIGN PATENT DOCUMENTS

CN 105975868 A 9/2016
CN 106682884 A 5/2017
(Continued)

OTHER PUBLICATIONS

Translation of CN108053198—Digital Media Transaction System Based on Blockchain Technology (Year: 2018).*
(Continued)

*Primary Examiner* — Patrick McAtee
*Assistant Examiner* — Zesheng Xiao

(57) ABSTRACT

Blockchain-based exchange method and apparatus for available resource quotas are disclosed. An example of method comprises: selecting, by a management node of a blockchain network, a set of object nodes as a target object according to a selection rule; determining, by the management node for each object node in the target object, a resource quota; determining, by the management node for the each object node, virtual resources corresponding to the resource quota as virtual resource decrements corresponding to the object node; and constructing, by the management node, a quota exchange transaction comprising the determined virtual resource decrements corresponding to the object node, and adding the quota exchange transaction to a blockchain on the blockchain network.

17 Claims, 6 Drawing Sheets

(51) Int. Cl.
*G06Q 20/36* (2012.01)
*G06Q 20/40* (2012.01)
*H04L 9/06* (2006.01)

(58) Field of Classification Search
USPC .................................................. 705/69
See application file for complete search history.

(56) References Cited

U.S. PATENT DOCUMENTS

| | | | |
|---|---|---|---|
| 8,694,350 B1* | 4/2014 | Cohen | G06Q 10/10 705/7.13 |
| 2001/0044774 A1 | 11/2001 | Sasazawa et al. | |
| 2008/0005001 A1* | 1/2008 | Davis | G06Q 40/02 705/35 |
| 2016/0283941 A1 | 9/2016 | Andrade | |
| 2016/0342977 A1 | 11/2016 | Lam | |
| 2017/0005804 A1 | 1/2017 | Zinder | |
| 2017/0048235 A1 | 2/2017 | Lohe et al. | |
| 2017/0116693 A1 | 4/2017 | Rae et al. | |
| 2017/0132615 A1 | 5/2017 | Castinado et al. | |
| 2017/0132625 A1 | 5/2017 | Kennedy | |
| 2017/0132626 A1 | 5/2017 | Kennedy | |
| 2017/0154331 A1 | 6/2017 | Voorhees | |
| 2017/0206522 A1 | 7/2017 | Schiatti et al. | |
| 2017/0301047 A1 | 10/2017 | Brown et al. | |
| 2017/0308920 A1 | 10/2017 | Tsuchiya | |
| 2017/0323392 A1 | 11/2017 | Kasper et al. | |
| 2018/0039667 A1 | 2/2018 | Pierce et al. | |
| 2018/0075028 A1 | 3/2018 | Ruschin et al. | |
| 2018/0075527 A1 | 3/2018 | Nagla et al. | |
| 2018/0117447 A1* | 5/2018 | Tran | G16H 10/60 |
| 2018/0374173 A1 | 12/2018 | Chen et al. | |

FOREIGN PATENT DOCUMENTS

| | | | |
|---|---|---|---|
| CN | 106897150 | A | 6/2017 |
| CN | 107079058 | A | 8/2017 |
| CN | 107145768 | A | 9/2017 |
| CN | 107330694 | A | 11/2017 |
| CN | 108053198 | A | 5/2018 |
| CN | 108960902 | A | 12/2018 |
| JP | 2001-312674 | A | 11/2001 |
| JP | 2010-211748 | A | 9/2010 |
| JP | 2017-199051 | A | 11/2017 |
| JP | 2018-049428 | A | 3/2018 |
| WO | 2018/092443 | A1 | 5/2018 |

OTHER PUBLICATIONS

Written Opinion for PCT Application No. PCT/CN2019/075785 dated May 27, 2019 (4 pages).
International Search Report for PCT Application No. PCT/CN2019/075785 dated May 27, 2019, with English machine translation (5 pages).
First Search dated Mar. 27, 2020, issued in related Chinese Application No. 201810610225.7 (1 page).
First Office Action dated Apr. 7, 2020, issued in related Chinese Application No. 201810610225.7, with English machine translation (17 pages).
Second Office Action dated Jun. 22, 2020, issued in related Chinese Application No. 201810610225.7, with English machine translation (15 pages).
Search Report dated Feb. 5, 2020, issued in related Taiwan Application No. 108101462 (1 page).
Office Action for Japanese Application No. 2020-540772 dated Nov. 15, 2021.
Written Opinion for Singapore Patent Application No. 11202006991R dated Apr. 15, 2022.
Notice of Allowance for Japanese Application No. JP2020-540772 dated Jun. 6, 2022.

* cited by examiner

Blockchain-based pre-exchange system for available resource quotas

BLOCKCHAIN-BASED SET EXCHANGE METHOD AND APPARATUS FOR AVAILABLE RESOURCE QUOTAS

CROSS-REFERENCE TO RELATED APPLICATIONS

The present application is a continuation application of PCT Application No. PCT/CN2019/075785 filed Feb. 22, 2019, which is based on and claims priority to Chinese Patent Application No. 201810610225.7, filed on Jun. 13, 2018, and entitled "BLOCKCHAIN-BASED SET EXCHANGE METHOD AND APPARATUS FOR AVAILABLE RESOURCE QUOTAS." All of the above-identified applications are incorporated herein by reference in their entirety.

TECHNICAL FIELD

Embodiments of the specification relate to the field of information technologies, and in particular, to a blockchain-based set exchange method and apparatus for available resource quotas.

BACKGROUND

To acquire earnings, creators of art works (such as musical works, literary works, fine art works, and the like) have long been licensing copyrights of the art works to a publisher for use, and the publisher distributes the art works. In practice, a large part of earnings generated during the distribution of the works belong to the publisher, and only a small part can be acquired by the creator.

With the development of blockchain technologies, it is possible to implement blockchain-based point-to-point distribution of copyright works. In a blockchain network, a node may be a creator or a user of a work. The creator may directly distribute the work to a user and acquire earnings without depending on a publisher.

At present, each blockchain node usually conducts a copyright use transaction by using a common currency in the market such as a digital currency (such as Bitcoin) or a legal currency (such as RMB) in an electronic form as a transaction medium.

For a copyright use event corresponding to a target work, a user node determines a payment amount, determines a currency of the payment amount as an expenditure corresponding to the user node, determines the currency of the payment amount as an income corresponding to a creator node, then constructs a copyright use transaction including the determined expenditure corresponding to the user node and the determined income corresponding to the creator node, and publishes the copyright use transaction to a blockchain. In this way, the creator can acquire earnings.

In addition to the existing technologies, the creator may acquire earnings in more diverse ways.

SUMMARY

Embodiments of the specification provide a blockchain-based set exchange method and apparatus for available resource quotas. The technical solutions are as follows:

In some embodiments, a blockchain-based exchange method for available resource quotas is provided, where a blockchain network includes a management node and several object nodes, each object node performing copyright use transactions by using virtual resources as transaction media, and the method includes: selecting, by the management node, several object nodes and/or a set of several object nodes as target objects according to a selection rule, each set of object nodes consisting of more than one object node; determining, for each target object, available resource quotas exchanged to each object node in the target object if the target object is a set of object nodes, for each object node in the target object, the available resource quotas exchanged to the object node being used for determining earning increments corresponding to the object node; determining, for each object node in the target object, virtual resources of the available resource quotas corresponding to the object node as virtual resource decrements corresponding to the object node; and constructing a quota exchange transaction including the determined virtual resource decrements corresponding to the object node, and publishing the quota exchange transaction to a blockchain.

In some embodiments, a blockchain-based set exchange apparatus for available resource quotas is provided, where a blockchain network includes the apparatus and several object nodes, each object node performing copyright use transactions by using virtual resources issued by the apparatus as transaction media, and the apparatus includes: a selection module, configured to select several object nodes and/or a set of several object nodes as target objects according to a selection rule, each set of object nodes consisting of more than one object node; an available resource quota determining module, configured to determine, for each target object, available resource quotas exchanged to each object node in the target object if the target object is a set of object nodes, for each object node in the target object, the available resource quotas exchanged to the object node being used for determining earning increments corresponding to the object node; a virtual resource decrement determining module, configured to determine, for each object node in the target object, virtual resources of the available resource quotas corresponding to the object node as virtual resource decrements corresponding to the object node; and a construction and publishing module configured to construct a quota exchange transaction including the determined virtual resource decrements corresponding to the object node, and publishing the quota exchange transaction to a blockchain.

In some embodiments, a blockchain-based set exchange system for available resource quotas is provided, including a management node and several object nodes, where each object node performs copyright use transactions by using virtual resources issued by the management node as transaction media; and the management node selects several object nodes and/or a set of several object nodes as target objects according to a selection rule, each set of object nodes consisting of more than one object node; determines, for each target object, available resource quotas exchanged to each object node in the target object if the target object is a set of object nodes, for each object node in the target object, the available resource quotas exchanged to the object node being used for determining earning increments corresponding to the object node; determines, for each object node in the target object, virtual resources of the available resource quotas corresponding to the object node as virtual resource decrements corresponding to the object node; and constructs a quota exchange transaction including the determined virtual resource decrements corresponding to the object node, and publishes the quota exchange transactions to a blockchain.

In some embodiments, a method comprises: selecting, by a management node of a blockchain network, a set of object nodes as a target object according to a selection rule; determining, by the management node for each object node in the target object, a resource quota; determining, by the management node for the each object node, virtual resources corresponding to the resource quota as virtual resource decrements corresponding to the object node; and constructing, by the management node, a quota exchange transaction comprising the determined virtual resource decrements corresponding to the object node, and adding the quota exchange transaction to a blockchain on the blockchain network.

In one embodiment, determining the resource quota comprises: determining a total resource quota for the set of object nodes; obtaining an earning ratio corresponding to the each object node in the target object; and obtaining, according to the earning ratio, the resource quota for the each object node in the target object.

In one embodiment, determining the resource quota comprises: determining an amount of remaining virtual resources corresponding to the target object as the total resource quota; the amount of remaining virtual resources corresponding to the target object is a sum of amounts of remaining virtual resources corresponding to the object nodes in the target object; and for the each object node, an amount of remaining virtual resources is preassigned by a user corresponding to the each object node.

In one embodiment, determining the resource quota comprises: determining a minimum amount of remaining virtual resources from a plurality of amounts of remaining virtual resources respectively corresponding to a plurality of target objects; selecting an amount not greater than the minimum amount of remaining virtual resources as the minimum amount of remaining virtual resources; and determining, for the each target object, the minimum amount of remaining virtual resources as the resource quota.

In one embodiment, obtaining the earning ratio comprises: determining, for the each object node, a ratio of an amount of remaining virtual resources corresponding to the each object node to an amount of remaining virtual resources corresponding to the target object, as the earning ratio corresponding to the each object node.

In one embodiment, selecting the set of object nodes as the target object according to the selection rule comprises selecting the set of object nodes as the target object according to the selection rule by invoking a smart contract stored on the blockchain; and the object nodes are configured to receive virtual resource increments through copyright use transactions.

In one embodiment, the selection rule comprises a competitiveness representation value algorithm; selecting the set of object nodes as the target object according to the selection rule comprises: determining, by the management node for the each object node, a competitiveness representation value by using the competitiveness representation value algorithm, and selecting a preset quantity of object nodes as the target node according to the competitiveness representation value respectively corresponding to the each object node; and for the each object node, a larger competitiveness representation value increases a chance of being selected as a target node.

In some embodiments, a non-transitory computer-readable storage medium stores instructions executable by one or more processors, wherein execution of the instructions causes the one or more processors to perform operations comprising: selecting, at a management node of a blockchain network, a set of object nodes as a target object according to a selection rule; determining, at the management node for each object node in the target object, a resource quota; determining, at the management node for the each object node, virtual resources corresponding to the resource quota as virtual resource decrements corresponding to the object node; and constructing, at the management node, a quota exchange transaction comprising the determined virtual resource decrements corresponding to the object node, and adding the quota exchange transaction to a blockchain on the blockchain network.

In some embodiments, a system comprises one or more processors and one or more non-transitory computer-readable storage media storing instructions executable by the one or more processors, wherein execution of the instructions causes the one or more processors to perform operations comprising: selecting, at a management node of a blockchain network, a set of object nodes as a target object according to a selection rule; determining, at the management node for each object node in the target object, a resource quota; determining, at the management node for the each object node, virtual resources corresponding to the resource quota as virtual resource decrements corresponding to the object node; and constructing, at the management node, a quota exchange transaction comprising the determined virtual resource decrements corresponding to the object node, and adding the quota exchange transaction to a blockchain on the blockchain network.

According to the technical solutions provided in the embodiments of the specification, a blockchain network includes a management node and object nodes, where each object node performs copyright use transactions by using virtual resources issued by the management node as transaction media. An object node may deliver virtual resources as a user in some copyright use events, and receive virtual resources as a creator in some copyright use events. For any set of object nodes, when the set of object nodes is selected as a target object by a management node, each object node in the set of object nodes may obtain specific available resource quotas used for determining earning increments corresponding to the object node. In addition, available resource quotas distributed to an object node need to be exchanged by using virtual resources possessed by the object node.

The foregoing general description and detailed description in the following are merely exemplary and interpretive, and cannot constitute a limitation to the embodiments of the specification.

In addition, any one of the embodiments of the specification does not need to achieve all the effects described above.

BRIEF DESCRIPTION OF THE DRAWINGS

To describe the technical solutions in the embodiments of the specification or in the existing technologies more clearly, the following briefly describes the accompanying drawings required for describing the embodiments or the existing technologies. Apparently, the accompanying drawings in the following description show merely some embodiments recorded in the embodiments of the specification, and a person of ordinary skill in the art may still derive other drawings from these accompanying drawings.

DETAILED DESCRIPTION OF THE INVENTION

Figure 1:
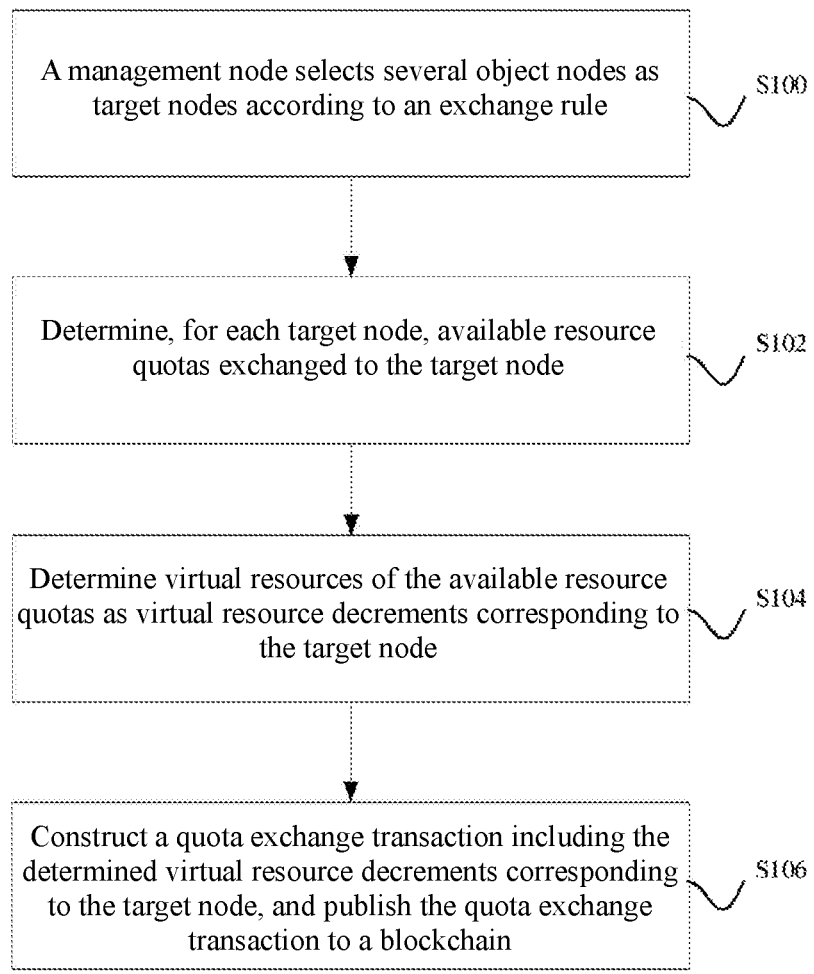
FIG. 1 is a schematic flowchart of a blockchain-based exchange method for available resource quotas, according to an embodiment of the specification.

A transaction (transfer) described in the specification refers to a piece of data that is created by a user through a client of a blockchain and that needs to be finally published to a distributed database of the blockchain.

The transaction in the blockchain includes transaction in a narrow sense and in a broad sense. The narrow-sense transaction refers to a value transaction issued by the user to the blockchain. For example, in a traditional Bitcoin blockchain network, a transaction may be a transaction initiated by the user in the blockchain. The broad-sense transaction refers to a piece of transaction data with a transaction intents issued by the user to the blockchain. For example, an operator may build an consortium blockchain based on actual transaction requirements, and rely on the consortium blockchain to deploy some other types of online transaction (for example, renting transaction, vehicle scheduling transaction, insurance claims transaction, credit services, medical service, and the like) that are not related to value transfer. However, in this type of consortium blockchain, the transaction may be a service message or a service request with a transaction intent issued by the user in the consortium blockchain.

In existing technologies, publishing a copyright use transaction to a blockchain means that a user node of a work transfers to a creator of the work (usually a copyright owner of the work) based on a copyright use event, and a transfer record is stored in the blockchain for publication. The copyright use event refers to all events involving the use of copyright works, for example, buying a novel, buying composed songs of creators, and downloading music.

A main feature of the existing blockchain-based copyright transaction model is that each node in a blockchain network uses a common currency in the market as a transaction medium to conduct copyright use transactions. This means that the common currency in the market acquired by a creator node by distributing a work is earnings acquired by the creator.

However, the technical solutions provided in the present application enrich ways in which a creator of a work acquires earnings.

For example, in the embodiments of the specification, a blockchain network includes a management node and an object node, each object node performing copyright use transactions by using virtual resources issued by the management node as transaction media.

Therefore, the present application provides a blockchain-based method for delivering virtual resources. A blockchain network includes a management node and several object nodes, each object node performing copyright use transactions by using virtual resources issued by the management node as transaction media, and the method for delivering virtual resources includes: determining, by a user node, a delivery amount for a copyright use event corresponding to a target work, the user node being an object node corresponding to a user that uses the target work; determining, by the user nodes, virtual resources of the delivery amount as virtual resource decrements corresponding to the user node, and determining the virtual resources of the delivery amount as virtual resource increments corresponding to a creator node, the creator node being an object node corresponding to a user that creates the target work; and constructing, by the user node, a copyright use transaction including the determined virtual resource decrements corresponding to the user node and the virtual resource increments corresponding to the creator node, and publishing the copyright use transaction to a blockchain.

The virtual resource may be a type of electronic data, and examples of the virtual resource may be game coins, points, virtual items, and the like.

The delivery amount is for example an amount of virtual resources required to be used for the target work, and may be preset by the creator of the target work.

In other words, in the foregoing method for delivering virtual resources, publishing a copyright use transaction to the blockchain comprises that the user node of the work delivers the virtual resources to the creator (who is usually a copyright owner of the work) of the work based on a copyright use event, and a virtual resource delivery record is stored in the blockchain for publication.

According to the foregoing method for delivering virtual resources, an object node may deliver virtual resources as a user in some copyright use events, and collect the virtual resources as a creator in some copyright use events. A virtual resource delivery record corresponding to each copyright use event is to be stored in the blockchain for publication. Remaining virtual resources corresponding to each object node may be determined based on the delivery record of the virtual resources that is stored in the blockchain.

In the foregoing method for delivering virtual resources, for each object node, the object node may not only collect virtual resources delivered by other object nodes based on the copyright use transaction, but also request the management node responsible for issuing the virtual resources to deliver the virtual resources to the object node with or without cost.

For example, a manner in which the management node delivers the virtual resources with payment is as follows.

The management node receives a refill request that includes a refill amount and that is sent by any object node; deducts property equivalent to virtual resources of the refill amount from a property account of the user corresponding to the object node; determines virtual resources of the refill amount as the virtual resource increments corresponding to the object node; and constructs a resource refill transaction including the determined virtual resource increments corresponding to the object node, and publishes the resource refill transaction to the blockchain.

The present application further provides a blockchain-based exchange method for available resource quotas. For any object node, when available resource quotas are distributed to the object node by a management node, the object node may acquire earnings (the available resource quotas are used for determining earning increments corresponding to the object node). In addition, the available resource quotas distributed to the object node need to be exchanged by using virtual resources possessed by the object node.

The present application further provides another blockchain-based exchange method for available resource quotas. For any set of object nodes, when the set of object nodes are selected as a target object by a management node, each object node in the set of object nodes may obtain specific available resource quotas used for determining earning increments corresponding to the object node. In addition, available resource quotas distributed to an object node need to be exchanged by using virtual resources possessed by the object node.

The present application further provides a blockchain-based method for pre-exchanging available resource quotas. For any object node, when the object node is selected as a pre-exchange node by a management node, the object node can be qualified to pre-exchange specific available resource quotas, and withdraw earnings in advance based on the pre-exchanged available resource quotas. In addition, the object node needs to repay virtual resources of the pre-exchanged available resource quotas with a future virtual resource income as a guarantee.

The foregoing technical solution provided in the present application may be applied to a copyright trading scenario of any type of works (such as fine arts, music, and literature). For convenience of description, a music copyright transaction scenario is used as an example for description below. In this scenario, the virtual resources may be referred to as "musical tone coins." A person skilled in the art should understand that this does not constitute a limitation on the present application.

The technical solutions in the embodiments of the specification are described in detail below with reference to the accompanying drawings in the embodiments of the specification. Apparently, the described embodiments are only some of the embodiments of the specification, other than all of the embodiments. Based on the embodiments in the specification, all other embodiments obtained by a person of ordinary skill in the art should fall within the protection scope.

The technical solutions provided in the embodiments of the specification are described in detail below with reference to the accompanying drawings.

FIG. 1 is a schematic flowchart of a blockchain-based exchange method for available resource quotas, according to an embodiment of the specification. The method may include the following steps.

S100: A management node selects several object nodes as target nodes according to a selection rule.

In the specification, a node may be a device having a data processing function and a communication function.

Nodes in a blockchain network may include management nodes and object nodes. For any object node, the object node may be a user node of a work A, where the user node delivers virtual resources to a creator node of the work A; or may be a creator node of a work B, where the creator node collects virtual resources delivered by a user node of the work B.

The management node may not be a participant (a user or a creator) of a copyright use event, but may be a manager of an entire copyright transaction system. Transaction media (namely, virtual resources) used by object nodes are issued by the management node, which means that in the copyright transaction system, virtual resources may be used as transaction media. However, beyond the scope of the copyright transaction system, virtual resources may not be used as transaction media. For example, the virtual resources issued by the management node may fail to be used for purchasing various merchandises in the market. Therefore, for a creator node of a work, collected virtual resources does not necessarily mean acquired earnings.

In some embodiments of the specification, the management node may perform step S100 once, periodically (for example, once a month), or irregularly. Further, the management node may perform the exchange method for available resource quotas shown in FIG. 1 once, periodically (for example, once a month), or irregularly.

In some embodiments of the specification, the selection rule may be specified according to actual service requirements. For example, the management node may randomly select 10 object nodes as target nodes according to the selection rule. For another example, the management node may successively select 10 object nodes as target nodes in a descending order of remaining virtual resources corresponding to object nodes.

For any object node, the remaining virtual resources corresponding to the object node may be virtual resource increments remaining after virtual resource decrements that correspond to the target node and that are stored in the blockchain are deducted from virtual resource increments that correspond to the object node and that are stored in the blockchain.

Further, several work categories may be preset, and for each work category, an association relationship between the several object nodes and the work category may be established. For example, several work categories (rock music, country music, jazz music, and the like) may be preset according to different music styles; then for each object node, at least one work category preferred by the object node is obtained; and an association relationship between the object node and the work category preferred by the object node is established. Assuming that a user A corresponding to an object node A is both a jazz music singer and a rock music lover, an association relationship between the object node A and the work category of jazz music may be established, and an association relationship between the object node A and the work category of rock music may be established.

In this way, in some embodiments of the specification, for each work category, the management node may select, according to the selection rule, several object nodes as the target nodes from the object nodes associated with the work category. For example, the management node may select 10 object nodes as the target nodes from object nodes associated with rock music, select six object nodes as target nodes from object nodes associated with country music, and select two object nodes as target nodes from object nodes associated with jazz music according to the selection rule.

Further, smart contract technologies may be used to ensure that the management node selects the target node in strict accordance with the selection rule. For example, in step S100, the management node may invoke a smart selection contract that includes the selection rule and that is stored in the blockchain, and select the several object nodes as the target nodes through the smart selection contract. The smart selection contract is stored in the blockchain after consensus verification of the nodes in the blockchain network succeeds in advance.

S102: Determine, for each target node, available resource quotas exchanged to the target node.

The several selected target nodes are actually object nodes that are qualified to exchange available resource quotas. For each target node, the available resource quotas exchanged to the target node are used for determining earning increments corresponding to the target node.

In some embodiments of the specification, there are a plurality of ways to determine the available resource quotas exchanged to each target node.

For example, for each target node, the available resource quotas exchanged to the target node may be determined according to a request of the target node. That is, for each target node, an amount of designated remaining virtual resources corresponding to the target node is determined as the available resource quotas exchanged to the target node. The amount of designated remaining virtual resources corresponding to the target node is an amount that is preassigned by a user corresponding to the target node and that is of at least some remaining virtual resources corresponding to the target node.

The available resource quotas exchanged to each target node may also be determined as a same value. For example, for each target node, a minimum amount of remaining virtual resources may be determined as the available resource quotas exchanged to the target node. The minimum amount of remaining virtual resources is determined in the following manner: a minimum amount of designated remaining virtual resources is determined from the amounts of designated remaining virtual resources respectively corresponding to the target nodes; and an amount not greater than the minimum amount of designated remaining virtual resources is designated as the minimum amount of remaining virtual resources.

S104: Determine virtual resources of the available resource quotas as virtual resource decrements corresponding to the target node.

S106: Construct a quota exchange transaction including the determined virtual resource decrements corresponding to the target node, and publish the quota exchange transaction to a blockchain.

In some embodiments of the specification, because available resource quotas issued to a target node need to be exchanged by using the virtual resources possessed by the target node, through steps S104 to S106, the virtual resources of the available resource quotas are deducted from the remaining virtual resources corresponding to the target node, the deduction record being publicly disclosed on the blockchain.

According to the blockchain-based exchange method for available resource quotas shown in FIG. 1, for a creator node of a work, virtual resources collected by distributing the work are not directly implemented as earnings. If the creator node intends to acquire earnings, the creator node not only needs to be selected as a target node by the management node to be qualified to exchange the available resource quotas, but also needs to expend the virtual resources possessed to exchange specific available resource quotas. The available resource quotas that are exchanged may be used to determine earning increments corresponding to the creator. In this way, the creator can acquire earnings.

In addition, in step S100, the management node may determine, according to the selection rule, an object node that satisfies the selection rule as the target node.

For each object node, that the object node satisfies the selection rule includes at least one of the following rules.

Rule 1: An amount of designated remaining virtual resources corresponding to the object nodes is not less than a first threshold.

Rule 2: During a statistical period, an amount of virtual resource increments that correspond to the object node and that are generated based on the copyright use transaction is not less than a second threshold.

For the rule 1, the amount of designated remaining virtual resources corresponding to the object node is an amount that is preassigned by a user corresponding to the object node and that is of at least some remaining virtual resources corresponding to the object node. An amount of designated remaining virtual resources corresponding to an object node means that a user corresponding to the object node designates most of the remaining virtual resources to participate in the selection.

For example, for object nodes A and B, remaining virtual resources (which may be musical tone coins) corresponding to the target node A are five musical tone coins, and remaining virtual resources corresponding to the object node B are eight musical tone coins. If a user A corresponding to the object node A designates, in advance, all of the musical tone coins to participate in the selection, an amount of designated remaining virtual resources corresponding to the object node A is 5. If a user B corresponding to the object node B designates, in advance, seven musical tone coins possessed to participate in the selection, an amount of designated remaining virtual resources corresponding to the object node B is 7.

The first threshold may be a fixed value specified according to actual service requirements. In the foregoing example, if the first threshold is 6, because the amount of designated remaining virtual resources corresponding to the object node A is 5, the object node A does not satisfy the rule 1, but the object node B satisfies the rule 1.

In addition, if the management node conducts a selection periodically, the first threshold may be different in each selection, that is, the first threshold is dynamically changed. This is because the amounts of designated remaining virtual resources respectively corresponding to the object nodes may change at any time. For example, it is assumed that the management node selects 10 object nodes as target nodes from 100 object nodes periodically (once a month). For each selection, the object nodes are sorted according to current amounts of designated remaining virtual resources respectively corresponding to the object nodes, and the amount of designated remaining virtual resources corresponding to the $10^{th}$ object node is determined as the first threshold.

The rule 1 means that the management node should select an object node with a larger amount of designated remaining virtual resources as a target node. If an amount of designated remaining virtual resources corresponding to each object node is an amount of remaining virtual resources corresponding to the object node, the rule 1 means that more virtual resources possessed by an object node indicate a higher priority in which the management node assigns the object node the qualification for exchanging available resource quotas.

Further, the rule 1 may be that, the amount of designated remaining virtual resources corresponding to the object node is not less than the first threshold, and a proportion of virtual resource increments generated based on the resource refill transaction to the remaining virtual resources of the amount of designated remaining virtual resources corresponding to the object node is not greater than a designated proportion.

The designated proportion may be specified according to actual needs, for example, may be 80%. The purpose is to prevent some object nodes from increasing, through recharging, remaining virtual resources corresponding to the object nodes to be selected as target nodes.

For the rule 2, the statistical period may be specified according to service requirements. For example, the management node selects a target node once every month. When the management node conducts a selection in May this year, the statistical period may be designated as April 1 to April 30.

The rule 2 means that, for an object node, during the statistical period, more virtual resources the object node collects as a creator node indicate a higher priority in which the management node assigns the object node the qualification for exchanging available resource quotas.

Similar to the first threshold, the second threshold may be a fixed value specified according to actual service requirements. In addition, if the management node conducts a selection regularly, the second threshold may be different in each selection, that is, the second threshold is dynamically changed. This is because the statistical periods corresponding to the selections are different. During a plurality of statistical periods, virtual resource increments that correspond to the object node and that are generated based on the copyright use transaction may change.

For example, it is assumed that the management node selects 10 object nodes as target nodes from 100 object nodes periodically (once a month). For each selection, during a statistical period corresponding to the selection, the object nodes are sorted according to virtual resource increments that correspond to the object nodes and that are generated based on copyright use transactions, and an amount of virtual resource increments corresponding to the $10^{th}$ object node is determined as the first threshold.

In addition, in step S100, the management node may determine, according to the selection rule, an object node that satisfies the selection rule; determine, for each object node that satisfies the selection rule, whether a user corresponding to the object node agrees to determine the object node as the target node; and if yes, determine the object node as the target node.

The management node pre-obtains, for each object node, a permission type corresponding to the object node, the permission type including one of a consent type, a query type, and a rejection type.

Based on this, for an object node, the determining whether a user corresponding to the object node agrees to determine the object node as the target node may be: if the permission type corresponding to the object node is the consent type, determining that a user corresponding to the object node agrees to determine the object node as the target node; if the permission type corresponding to the object node is the query type, querying whether the user corresponding to the object node agrees to determine the object node as the target node; or if the permission type corresponding to the object node is the rejection type, determining that the user corresponding to the object node does not agree to determine the object node as the target node.

In addition, in some embodiments of the specification, a target node may be selected from the object nodes by calculating a competitiveness representation value corresponding to each object node. In this case, the selection rule may be a competitiveness representation value algorithm.

For example, in step S100, the management node may calculate, for each object node, a competitiveness representation value corresponding to the object node by using the competitiveness representation value algorithm, and select a preset quantity of object nodes as target nodes according to the competitiveness representation values respectively corresponding to the object nodes. For each object node, a larger competitiveness representation value corresponding to the object node indicates a higher priority in which the object node is selected as the target node.

In practical applications, a competitiveness representation value algorithm may be specified according to actual service requirements. An example is used herein.

The management node may calculate, for each object node, the competitiveness representation value corresponding to the object node by using a characteristic parameter corresponding to the object node as an input of the competitiveness representation value algorithm.

The characteristic parameter corresponding to the object node includes at least one of the following: characteristic parameter 1: an amount of designated remaining virtual resources corresponding to the object nodes, where the meaning of the amount of designated remaining virtual resources has been described above, and details are not described again; characteristic parameter 2: a proportion of virtual resource increments generated based on a copyright use transaction to virtual resources of the amount of designated remaining virtual resources corresponding to the object node; and characteristic parameter 3: during a statistical period, an amount of the virtual resource increments that correspond to the object node and that are generated based on the copyright use transaction;

The composition of the characteristic parameters corresponding to each object node is the same. For example, assuming that characteristic parameters corresponding to the object node are the characteristic parameter 1 and the characteristic parameter 2, the characteristic parameters corresponding to each object node are the characteristic parameter 1 and the characteristic parameter 2.

For example, some embodiments of the specification provide a formula for calculating a competitiveness representation value as follows:

$$\partial * (a*X + b*Y)$$

where X is the characteristic parameter 1, Y is the characteristic parameter 3, a is a weight corresponding to X, and b is a weight corresponding to Y. When the characteristic parameter 2 is greater than a specified ratio, $\partial$ is 1, and when the characteristic parameter 2 is not greater than the specified ratio, $\partial$ is 0.

Further, a method of selecting a preset quantity of object nodes as target nodes according to the competitiveness representation values respectively corresponding to the object nodes is: sorting the object nodes in descending order of the competitiveness representation values respectively corresponding to the object nodes; selecting a first object node; determining whether a user corresponding to the object node agrees to determine the object node as the target node; and if yes, determining the object node as the target node; or if not, skipping determining the object node as the target node; and continuing to select a next object node until the preset quantity of target nodes are determined.

In addition, in practical applications, the management node may specify a conversion ratio between available resource quotas and earning increments, and calculate, according to the conversion ratio and available resource quotas exchanged to a target node, earning increments corresponding to the target node. For example, the conversion ratio may be specified as 1:100, that is, if an available resource quota is 1, an earning increment that can be obtained through conversion is 100 yuan.

The conversion ratio is not necessarily a purchase ratio based on which the object node purchases virtual resources from the management node. For example, the object node needs to spend 80 yuan on purchasing one musical tone coin from the management node, and the available resource quota is 1, which may be converted into an earning increment of 100 yuan.

A manager corresponding to the management node may dynamically adjust the conversion ratio and the purchase ratio according to actual service requirements.

The earning increment corresponding to the target node may be paid by a user corresponding to the management node to the user corresponding to the target node, or may be paid by other organizations or individuals to the user corresponding to the target node. In fact, it may be agreed in advance depending on the specific situation.

Herein, the technical solution is combined with an actual application scenario to exemplify the technical solution. The following exemplary description is merely to help understand the solution, and does not constitute a limitation on the implementation of the solution.

A music company X builds a blockchain-based music copyright transaction system to cultivate copyright payment habits of a user. In the music copyright transaction system, a server of the music company X serves as a management node to issue musical tone coins, and music writers or music listeners serve as object nodes to use musical tone coins as transaction media to conduct copyright use transactions.

For music writers, a main source of musical tone coins is from collecting musical tone coins by music listeners in a copyright use event. For music listeners, a main source of musical tone coins is from purchasing musical tone coins with their own property by initiating a resource refill request to the management node (e.g., assuming that it costs 80 yuan to buy one musical tone coin). The music company X intends to give music writers more opportunities to convert musical tone coins acquired by the music writers based on copyright use transaction earnings into available resource quotas, and to limit music listeners as much as possible to convert musical tone coins refilled by the music listeners into available resource quotas.

Therefore, the server of the music company X periodically (for example, every quarter) performs the exchange method for available resource quotas shown in FIG. 1. A strategy for the server of the music company X to select target nodes is as follows.

1. The object nodes are sorted in a descending order of amounts of designated remaining virtual resources of musical tone coins respectively corresponding to the object nodes (the amounts are designated by users corresponding to the object nodes in advance and vary from person to person; the amount of designated remaining virtual resources of musical tone coins may be an amount of remaining virtual resources of musical tone coins, or may be less than an amount of remaining virtual resources of musical tone coins), and the first 100 object nodes are selected to form a list 1.

2. The object nodes are sorted according to values of musical tone coin increments (e.g., a musical tone coin income) that are of the object nodes and that are generated based on copyright use transactions in the previous quarter, and the first 100 object nodes are selected to form a list 2.

3. An object node with a proportion of an amount of musical tone coins generated based on copyright use to corresponding margins of musical tone coins greater than 80% is selected from the object nodes, to form a list 3.

Then, based on the lists 1 to 3, object nodes that simultaneously appear in the three lists are determined as candidate nodes. For each candidate node, it is determined whether a user corresponding to the candidate node agrees to exchange available resource quotas, candidate nodes that do not agree to exchange available resource quotas are excluded, and the remaining candidate nodes are determined as target nodes.

The music company X determines a minimum value of the amount of designated remaining virtual resources of musical tone coins as the available resource quota (assumed to be 1000) according to the amounts of designated remaining virtual resources of musical tone coins corresponding to the target nodes. Then, through a consensus mechanism of the blockchain, 1000 musical tone coins are deducted from the margins of the musical tone coins of each target node. According to regulations of the music company X, the available resource quota of 1 may be converted into earning increments of 100. In this case, a resource quota is 1000, and a corresponding earning increment may reach 100000 yuan.

For any target node, if a user (generally a music writer selected through the foregoing selection rule) corresponding to the target node provides an artistic service (for example, attending commercial performances, and composing music for others) in real life, in addition to the commission (assumed to be 50000 yuan) for providing the service, the user corresponding to the target node may further obtain a reward of 100000 yuan from the music company X. In other words, the user corresponding to the target node acquires earnings of 15 yuan through an artistic service.

If the user corresponding to the target node rejects to provide artistic services for others in real life, an available resource quota corresponding to the target node cannot be converted into earning increments to be paid to the user in this case.

In this way, the art company builds a music copyright transaction system with a virtuous circle. Through the operation of the music copyright transaction system, first, habits of paying for music by music listeners are cultivated; and second, an earning incentive mechanism is formed for music writers, to encourage music writers to create more works loved by music listeners and provide more artistic services for others in real life.

Figure 2:
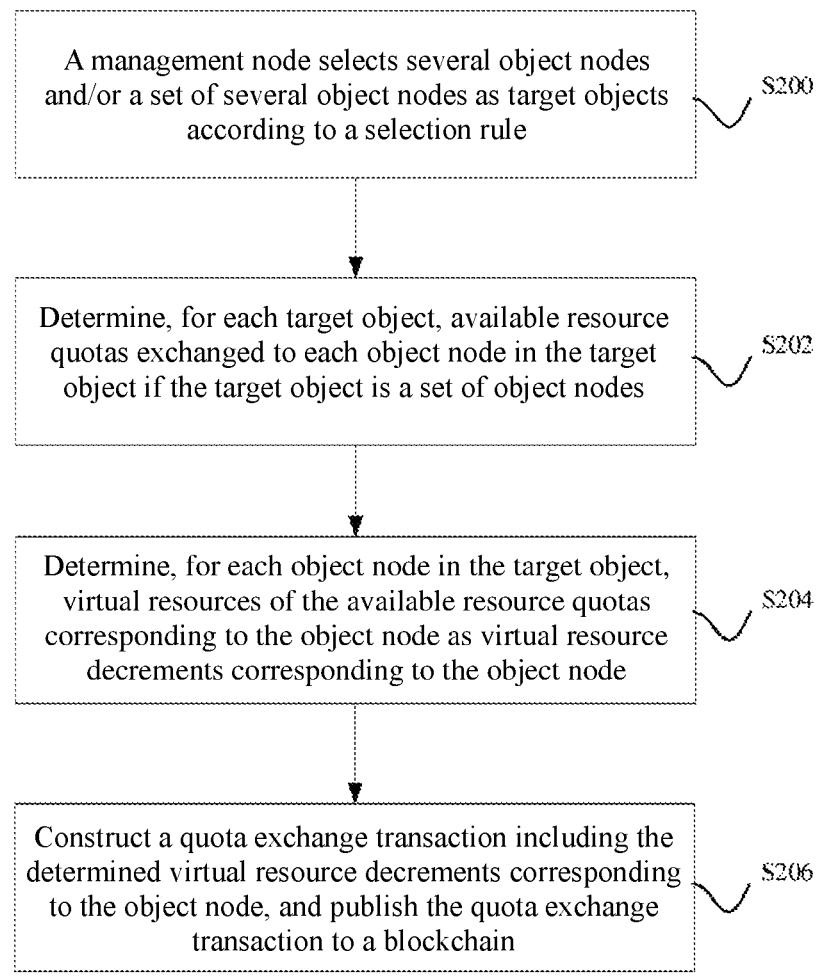
FIG. 2 is a schematic flowchart of a blockchain-based set exchange method for available resource quotas, according to an embodiment of the specification.

FIG. 2 is a schematic flowchart of a blockchain-based set exchange method for available resource quotas, according to an embodiment of the specification, including the following steps.

S200: A management node selects several object nodes and/or a set of several object nodes as target objects according to a selection rule. In some embodiments, S200 comprises selecting, by a management node of a blockchain network, a set of object nodes as a target object according to a selection rule.

S202: Determine, for each target object, available resource quotas exchanged to each object node in the target object if the target object is a set of object nodes. In some embodiments, S202 comprises determining, by the management node for each object node in the target object, a resource quota.

S204: Determine, for each object node in the target object, virtual resources of the available resource quotas corresponding to the object node as virtual resource decrements corresponding to the object node. In some embodiments, S204 comprises determining, by the management node for the each object node, virtual resources corresponding to the resource quota as virtual resource decrements corresponding to the object node.

S206: Construct a quota exchange transaction including the determined virtual resource decrements corresponding to the object node, and publish the quota exchange transaction to a blockchain. In some embodiments, S206 comprises constructing, by the management node, a quota exchange transaction comprising the determined virtual resource decrements corresponding to the object node, and adding the quota exchange transaction to a blockchain on the blockchain network.

In the method shown in FIG. 2, a plurality of object nodes are allowed to form a set of object nodes, and the set of object nodes is used as a unit to participate in the selection. For example, for a set of object nodes, an amount of designated remaining virtual resources corresponding to the set of object nodes is actually accumulated by amounts of designated remaining virtual resources corresponding to object nodes in the set of object nodes. For each object node in the set of object nodes, a ratio of the amount of designated remaining virtual resources corresponding to the object node to the amount of designated remaining virtual resources corresponding to the set of object nodes is an earning ratio corresponding to the object node. For a set of object nodes, an earning ratio corresponding to each object node in the set of object nodes may be specified by the object node in the set of object nodes in advance.

In the method shown in FIG. 2, the target object refers to an object node or a set of object nodes selected by the management node according to the selection rule. Various methods of determining the target node in the method shown in FIG. 1 are also applicable to determining the target object in the method shown in FIG. 2. That is, in step S200, each set of object nodes may be temporarily considered as an object node for selection of target objects.

Once a set of object nodes is selected as a target object, object nodes in the set of object nodes may jointly obtain the qualification for exchanging available resource quotas.

A manner in which available resource quotas exchanged to each object node in the target objects are determined is as follows.

The management node may determine the available resource quotas exchanged to the target object; obtain an earning ratio corresponding to each object node in the target object; and then for each object node in the target object, obtain, according to the earning ratio corresponding to the object node and the available resource quotas exchanged to the target object, the available resource quotas exchanged to the object node.

An amount of designated remaining virtual resources corresponding to the target object may be determined as the available resource quotas exchanged to the target object. The amount of designated remaining virtual resources corresponding to the target object is a sum of amounts of designated remaining virtual resources corresponding to the object nodes in the target object. For each object node, the amount of designated remaining virtual resources corresponding to the object node is an amount that is preassigned by a user corresponding to the object node and that is of at least some remaining virtual resources corresponding to the object node.

Alternatively, for each target object, a minimum amount of remaining virtual resources may be determined as the available resource quotas exchanged to the target object. The minimum amount of remaining virtual resources is determined in the following manner: a minimum amount of designated remaining virtual resources is determined from the amounts of designated remaining virtual resources respectively corresponding to the target objects; and an amount not greater than the minimum amount of designated remaining virtual resources is designated as the minimum amount of remaining virtual resources.

For each object node in the target object, a ratio of the amount of designated remaining virtual resources corresponding to the object node to the amount of designated remaining virtual resources corresponding to the target object may be calculated, as an earning ratio corresponding to the object node.

Further, an application scenario of the method shown in FIG. 2 may be as follows. Sometimes, it may be difficult for some object nodes that participate in a selection of target nodes separately to be selected (for example, music writers who are not popular with music listeners often earn very few musical tone coins and cannot obtain the qualification for exchanging available resource quotas). Therefore, a plurality of object nodes that are ineligible to be selected as target nodes may be combined into a set of object nodes and participate in the selection as a unit. Once the set of object nodes is selected as a target object, the object nodes may use virtual resources thereof to exchange available resource quotas and then share earning increments converted from the available resource quotas.

A method of selecting a representative node by the object nodes in the set of object nodes may be, for example, voting, a random designation method, a Monte Carlo algorithm, or the like.

The example of the music company X mentioned above is still used. It is assumed that an amount of designated remaining virtual resources corresponding to a specific set of object nodes is 1200 (musical tone coins); the set of object nodes includes object nodes A to C; and in the amount of designated remaining virtual resources of 1200, 800 musical tone coins are from the object node A, 300 musical tone coins are from the object node B, and 100 musical tone coins are from the object node C. Therefore, an earning ratio corresponding to the object node A is 2/3, an earning ratio corresponding to the object node B is 1/4, and an earning ratio corresponding to the object node C is 1/12. If the set of object nodes is selected as a target object, and an available resource quota granted by the management node to the set of object nodes is 1200, an available resource quota corresponding to the object node A is 800 (a corresponding earning increment is 80000 yuan), an available resource quota corresponding to the object node B is 300 (a corresponding earning increment is 30000 yuan), and an available resource quota corresponding to the object node C is 100 (a corresponding earning increment is 10000 yuan). In addition, the object nodes in the set of object nodes need to select an object node as a representative node, and the music company X separately pays earning increments to the object nodes A to C when a user corresponding to the representative node provides artistic services for others in real life.

Figure 3:
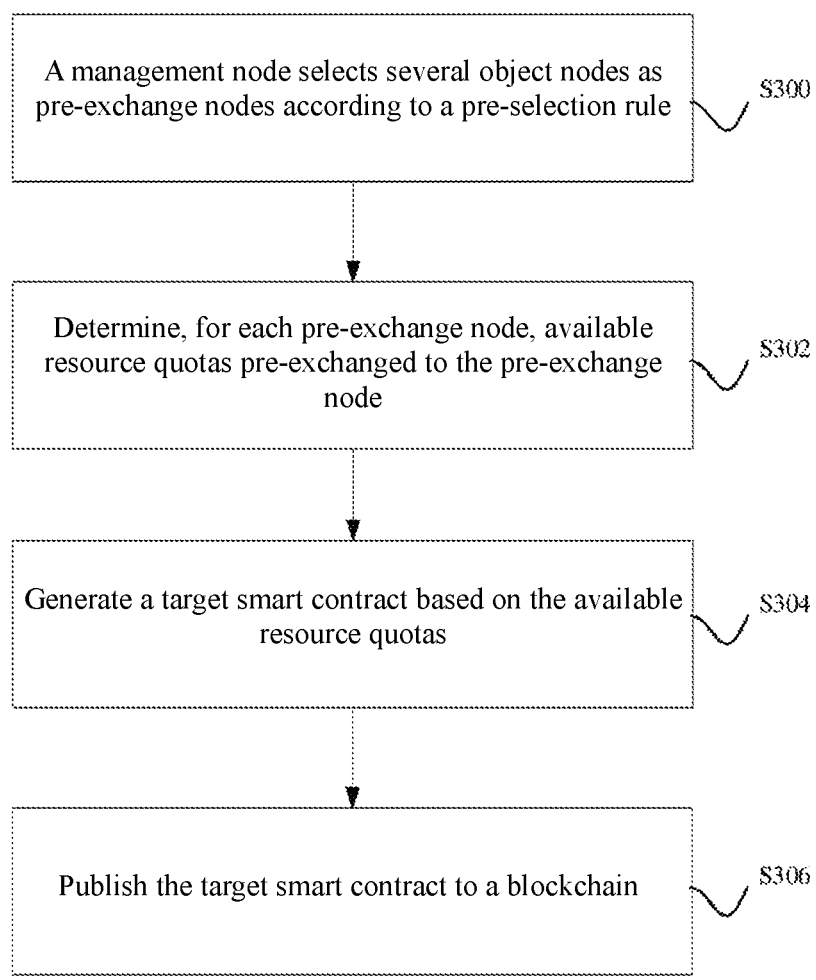
FIG. 3 is a schematic flowchart of a blockchain-based method for pre-exchanging available resource quotas, according to an embodiment of the specification.

FIG. 3 is a schematic flowchart of a blockchain-based method for pre-exchanging available resource quotas, according to an embodiment of the specification, including the following steps.

S300: A management node selects several object nodes as pre-exchange nodes according to a pre-selection rule.

S302: Determine, for each pre-exchange node, available resource quotas pre-exchanged to the pre-exchange node.

S304: Generate target smart contract based on the available resource quotas.

S306: Publish the target smart contract to a blockchain.

In the exchange method for available resource quotas shown in FIG. 1, for each selected target node, the available resource quotas that may be exchanged by the target node are usually not greater than the amount of remaining virtual resources corresponding to the target node; otherwise the balance of payments of each object node cannot be ensured.

In the method shown in FIG. 3, the management node may further select the several object nodes as the pre-exchange nodes according to the pre-selection rule. For each pre-exchange node, the pre-exchange node may pre-exchange the available resource quotas (which may be greater than the amount of remaining virtual resources corresponding to the pre-exchange node) without a limitation of remaining virtual resources corresponding to the pre-exchange node. The available resource quotas pre-exchanged to the pre-exchange node are used for determining earning increments corresponding to the target node.

For example, for each pre-exchange node, the management node does not initiate a resource exchange transaction (that is, virtual resources of pre-exchange quotas are deducted from the remaining virtual resources corresponding to the pre-exchange node), but generates a target smart contract based on the available resource quotas. The target smart contract is used to deduct virtual resources of the available resource quotas from future increments of virtual resources corresponding to the pre-exchange node. The future increments of the virtual resources corresponding to the pre-exchange node are virtual resource increments that are to be stored in a blockchain and that correspond to the pre-exchange node.

In other words, for each selected pre-exchange node, the management node may issue "loans" of a specific amount of virtual resources for the pre-exchange node with the future increments of the virtual resources corresponding to the pre-exchange node as a guarantee, and a "contract of loan" is stored in the blockchain in the form of a smart contract to ensure that the future increments of the virtual resources corresponding to the pre-exchange node are preferentially used to repay the pre-exchanged available resource quotas. In addition, for each pre-exchange node, a user corresponding to the pre-exchange node may obtain excess earnings in advance by virtue of pre-exchanged available resource quotas.

To allow the selected pre-exchange node to possess a specific repayment capability as much as possible, a specific method in which the management node selects several object nodes as pre-exchange nodes according to a pre-selection rule is as follows.

The management node determines, for each object node, whether an amount of virtual resource increments corresponding to the object node in each of a plurality of first cycles is greater than a designated amount; and if yes, determines the object node as the pre-exchange node; otherwise, rejects to determine the object node as the pre-exchange node. The designated amount may be specified according to actual service requirements.

For example, assuming that the first cycle is one month, it may be determined that, in each month of the recent three months, whether the amount of virtual resource increments corresponding to the object node is greater than the designated amount.

Further, a method of determining whether the amount of virtual resource increments that correspond to the object node and that are published to the blockchain in each of the plurality of first cycles is greater than the designated amount is: determining whether an amount of virtual resource increments that correspond to the object node and that are generated based on copyright use transactions in each of a plurality of first cycles is greater than the designated amount.

In addition, in the method shown in FIG. 3, the target smart contract is further used to deduct virtual resources of an interest amount from the future increments of the virtual resources corresponding to the pre-exchange node. The virtual resources of the interest amount may be viewed as the price paid by the pre-exchange node for obtaining excess earnings in advance.

Further, for each pre-exchange node, a method in which the management node determines available resource quotas pre-exchanged to the pre-exchange node may be:

determining, according to an amount of virtual resource increments corresponding to the pre-exchange node in each of a plurality of second cycles, available resource quotas pre-exchanged to the pre-exchange node.

For example, for a pre-exchange node, if an amount of musical tone coins that the pre-exchange node earns in each of recent three months is greater than 600, it indicates that there is a high probability that the pre-exchange node may have a repayment capability of 600 musical tone coins in each of several coming months. Therefore, it may be determined that an available resource quota pre-exchanged to the pre-exchange node is 600.

For another example, for a pre-exchange node, if the pre-exchange node has an income of more than 600 musical tone coins in one of recent three months, and an income of musical tone coins in each of the other two months less than 300, an average value (that is, 400) of the amounts of the musical tone coins that the pre-exchange node has earned in the recent three months may be used as the available resource quotas pre-exchanged to the pre-exchange node.

Similarly, for each pre-exchange node, the management node may determine, according to an amount of virtual resource increments corresponding to the pre-exchange node in each of a plurality of third cycles, the available resource quotas pre-exchanged to the pre-exchange node.

For example, for a pre-exchange node, if an amount of musical tone coins that the pre-exchange node earns based on copyright use transactions in each of recent three months is greater than 600, it indicates that the amount of musical tone coins that the pre-exchange node earns every month is stable, and an interest amount corresponding to the pre-exchange node may be relatively small.

For another example, for a pre-exchange node, if the pre-exchange node has an income of more than 600 musical tone coins in one of recent three months, and an income of musical tone coins in each of the other two months less than 300, it indicates that the monthly amount of musical tone coins earned by the pre-exchange node is unstable, and there is a high probability that the pre-exchange node cannot repay the pre-exchanged available resource quotas in the future. Therefore, an interest amount corresponding to the pre-exchange node may be relatively large.

The first cycle, the second cycle, and the third cycle described herein may be the same cycle or different cycles.

In the method shown in FIG. 3, a set of object nodes may also be qualified to pre-exchange available resource quotas. According to an earning ratio corresponding to each object node in the set of object nodes, the available resource quotas pre-exchanged to each object node in the set of object nodes are determined, and for each object node in the set of object nodes, the virtual resources (which may further include virtual resources of interest amounts) of the available resource quotas that are pre-exchanged to the object node are deducted from the future increments of the virtual resources corresponding to the object node.

In addition, a person skilled in the art should understand that, in practical applications, the exchange method for available resource quotas shown in FIG. 1, the exchange method for available resource quotas shown in FIG. 2, and the method for pre-exchanging available resource quotas shown in FIG. 3 may be all implemented separately. At least two methods may also be selected for combined use from the exchange method for available resource quotas shown in FIG. 1, the exchange method for available resource quotas shown in FIG. 2, and the method for pre-exchanging available resource quotas shown in FIG. 3, and a combined implementation also falls within the protection scope claimed by the present application.

For example, the methods shown in FIG. 1 and FIG. 3 may be combined. In some embodiments, after the method shown in FIG. 1 is performed for each object node, that is, after each target node is selected and each target node is qualified to exchange available resource quotas, the method shown in FIG. 3 may be performed. That is, the pre-selection rule is further used to select several pre-exchange nodes from the target nodes, and each pre-exchange node is additionally qualified to pre-exchange available resource quotas. In this case, for each pre-exchange node, the pre-exchange node is not only qualified to use remaining virtual resources to exchange available resource quotas, but also qualified to pre-exchange more available resource quotas with the future increments of the virtual resources as a guarantee.

The example of the music company X mentioned above is still used. The management node finds, when qualifying a target node to use remaining virtual resources of the target node to exchange 1000 available resource quotas, that the target node has generated considerable earnings (such as greater than 500) from musical tone coins based on copyright use transactions in each of recent three quarters. Therefore, the management node may further determine the target node as a pre-exchange node, further qualifies the pre-exchange node to pre-exchange 1000 available resource quotas, and agrees, through a smart contract, with the pre-exchange node that the pre-exchange node uses future increments of virtual resources of the pre-exchange node to repay the pre-exchanged available resource quotas and the corresponding interest amount (for a total of 1200 musical tone coins) in the next three quarters.

In addition, in the blockchain-based method for delivering virtual resources described above, the use of virtual resources may not be limited to copyright transactions, but also includes the following two aspects.

1. Any object node can use virtual resources thereof to purchase merchandises or services from the management node.

For example, the object node may determine a payment amount, use virtual resources of the payment amount as virtual resource decrements corresponding to the object node, construct a merchandise purchase transaction including the determined virtual resource decrements or a service purchase transaction including the determined virtual resource decrements, and publish the merchandise purchase transaction or the service purchase transaction to a blockchain.

For example, when a user corresponding to an object node needs to purchase a guitar, the user may pay 100 musical tone coins to the management node through the object node, and the management node delivers a guitar to the user.

A service purchased by an object node may be a promotion right granted by the management node, the right including but not limited to that the management node sends promotion information for advertising a work of the object node to other object nodes.

2. Any object node may use virtual resources thereof to purchase merchandises or services from a third-party device (such as an e-commerce server) in addition to other object nodes and the management node.

For example, the object node may determine a payment amount, construct a merchandise purchase request or a service purchase request including the payment amount, and send the merchandise purchase request or the service purchase request to the third-party device to purchase the merchandise or the service. After providing the merchandise or the service to the object node, the third-party device sends an exchange request including the payment amount to the management node. The management node converts the payment amount into a property amount according to the exchange request, and pays property of the property amount to the third-party device.

For example, if a music writer (an object node) intends to make a record, and needs to pay a record company (a third-party device) a production fee of 10000 yuan, the music writer may use possessed musical tone coins for payment. For example, 100 musical tone coins (assuming that the management node stipulates that one musical tone coin is equivalent to 100 yuan) may be paid to the record company, and subsequently, the record company may request the management node to exchange the 100 musical tone coins, thereby obtaining a production fee of 10000 yuan.

Figure 4:
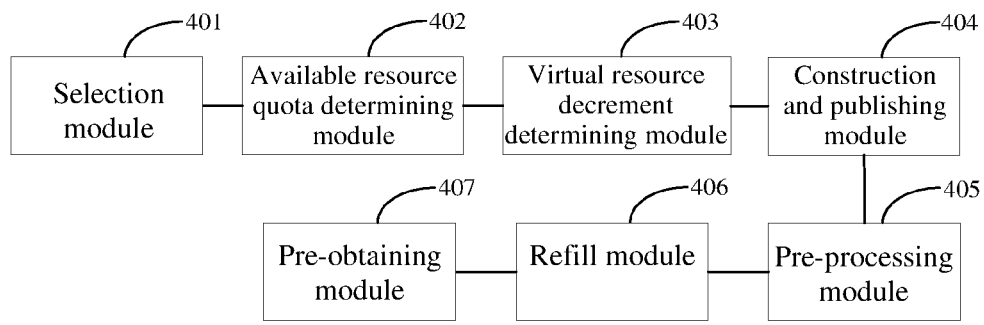
FIG. 4 is a schematic structural diagram of a blockchain-based exchange apparatus for available resource quotas, according to an embodiment of the specification.

Based on the blockchain-based exchange method for available resource quotas shown in FIG. 1, an embodiment of the specification further provides a blockchain-based exchange apparatus for available resource quotas. As shown in FIG. 4, a blockchain network includes the apparatus and several object nodes, each object node performing copyright use transactions by using virtual resources issued by the apparatus as transaction media, and the apparatus includes: a selection module 401, configured to select several object nodes as target nodes according to a selection rule; an available resource quota determining module 402, configured to determine, for each target node, available resource quotas exchanged to the target node, the available resource quotas exchanged to the target node being used for determining earning increments corresponding to the target node; a virtual resource decrement determining module 403, configured to determine virtual resources of the available resource quotas as virtual resource decrements corresponding to the target node; and a construction and publishing module 404, configured to construct a quota exchange transaction including the determined virtual resource decrements corresponding to the target node, and publish the quota exchange transaction to a blockchain.

The apparatus further includes: a pre-processing module 405, configured to preset several work categories, and establish, for each work category, an association relationship between the several object nodes and the work category.

The selection module 401 is configured to: for each work category, select, according to the selection rule, several object nodes as the target nodes from object nodes associated with the work category.

The selection module 401 is configured to invoke a smart selection contract that includes the selection rule and that is stored in the blockchain; and select the several object nodes as the target nodes through the smart selection contract.

The selection module 401 is configured to: determine, according to the selection rule, an object node that satisfies the selection rule as the target node; or determine, according to the selection rule, the object node that satisfies the selection rule; determine, for each object node that satisfies the selection rule, whether a user corresponding to the object node agrees to determine the object node as the target node; and if yes, determine the object node as the target node For each object node, that the object node satisfies the selection rule includes: an amount of designated remaining virtual resources corresponding to the object node is not less than a first threshold, the amount of designated remaining virtual resources corresponding to the object node being an amount that is preassigned by the user corresponding to the object node and that is of at least some remaining virtual resources corresponding to the object node, and the remaining virtual resources corresponding to the object node being virtual resource increments remaining after the virtual resource decrements that correspond to the target node and that are stored in the blockchain are deducted from virtual resource increments that correspond to the object node and that are stored in the blockchain; and/or during a statistical period, an amount of the virtual resource increments that correspond to the object node and that are generated based on the copyright use transaction is not less than a second threshold.

The apparatus further includes: a refill module 406, configured to: receive a refill request that includes a refill amount and that is sent by any object node; deduct property equivalent to virtual resources of the refill amount from a property account of the user corresponding to the object node; determine virtual resources of the refill amount as the virtual resource increments corresponding to the object node; and construct a resource refill transaction including the determined virtual resource increments corresponding to the object node, and publish the resource refill transaction to the blockchain.

That an amount of designated remaining virtual resources corresponding to the object node is not less than a first threshold includes: the amount of designated remaining virtual resources corresponding to the object node is not less than the first threshold, and a proportion of virtual resource increments generated based on the resource refill transaction to the remaining virtual resources of the amount of designated remaining virtual resources corresponding to the object node is not greater than a designated proportion.

The selection rule includes: a competitiveness representation value algorithm; and the selection module 401 is configured to calculate, for each object node, a competitiveness representation value corresponding to the object node by using the competitiveness representation value algorithm; and select a preset quantity of object nodes as the target nodes according to the competitiveness representation values respectively corresponding to the object nodes.

For each object node, a larger competitiveness representation value corresponding to the object node indicates a higher priority in which the object node is selected as the target node.

The selection module 401 is configured to calculate, for each target node, a competitiveness representation value corresponding to the object node by using a characteristic parameter corresponding to the object node as an input of the competitiveness representation value algorithm, where the characteristic parameter corresponding to the object node includes at least one of the following: (1) an amount of designated remaining virtual resources corresponding to the object node, the amount of designated remaining virtual resources corresponding to the object node being an amount that is preassigned by the user corresponding to the object node and that is of at least some remaining virtual resources corresponding to the object node, and the remaining virtual resources corresponding to the object node being virtual resource increments remaining after the virtual resource decrements that correspond to the target node and that are stored in the blockchain are deducted from virtual resource increments that correspond to the object node and that are stored in the blockchain; (2) a proportion of virtual resource increments generated based on a copyright use transaction to virtual resources of the amount of designated remaining virtual resources corresponding to the object node; and (3) during a statistical period, an amount of the virtual resource increments that correspond to the object node and that are generated based on the copyright use transaction.

The selection module 401 is configured to: sort the object nodes in descending order of the competitiveness representation values respectively corresponding to the object nodes; select a first object node; determine whether a user corresponding to the object node agrees to determine the object node as the target node; and if yes, determine the object node as the target node; or if not, skip determining the object node as the target node; and continue to select a next object node until the preset quantity of target nodes are determined.

The apparatus further includes: a pre-obtaining module 407, configured to obtain, for each object node, a permission type corresponding to the object node, the permission type including one of a consent type, a query type, and a rejection type.

The selection module 401 is configured to: if the permission type corresponding to the object node is the consent type, determine that the user corresponding to the object node agrees to determine the object node as the target node; if the permission type corresponding to the object node is the query type, query whether the user corresponding to the object node agrees to determine the object node as the target node; or if the permission type corresponding to the object node is the rejection type, determine that the user corresponding to the object node does not agree to determine the object node as the target node.

The available resource quota determining module 402 is configured to determine, for each target node, an amount of designated remaining virtual resources corresponding to the target node as the available resource quotas exchanged to the target node, the amount of designated remaining virtual resources corresponding to the target node being an amount that is preassigned by a user corresponding to the target node and that is of at least some remaining virtual resources corresponding to the target node; or determine, for each target node, a minimum amount of remaining virtual resources as the available resource quotas exchanged to the target node.

The minimum amount of remaining virtual resources is determined in the following manner: a minimum amount of designated remaining virtual resources is determined from the amounts of designated remaining virtual resources respectively corresponding to the target nodes; and an amount not greater than the minimum amount of designated remaining virtual resources is designated as the minimum amount of remaining virtual resources.

In some embodiments, the various modules of the apparatus of FIG. 4 may be implemented as software instructions or a combination of software and hardware. For example, the apparatus of FIG. 4 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the apparatus of FIG. 4 may include a server, a mobile phone, a tablet computer, a PC, a laptop computer, another computing device, or a combination of one or more of these computing devices.

Figure 5:
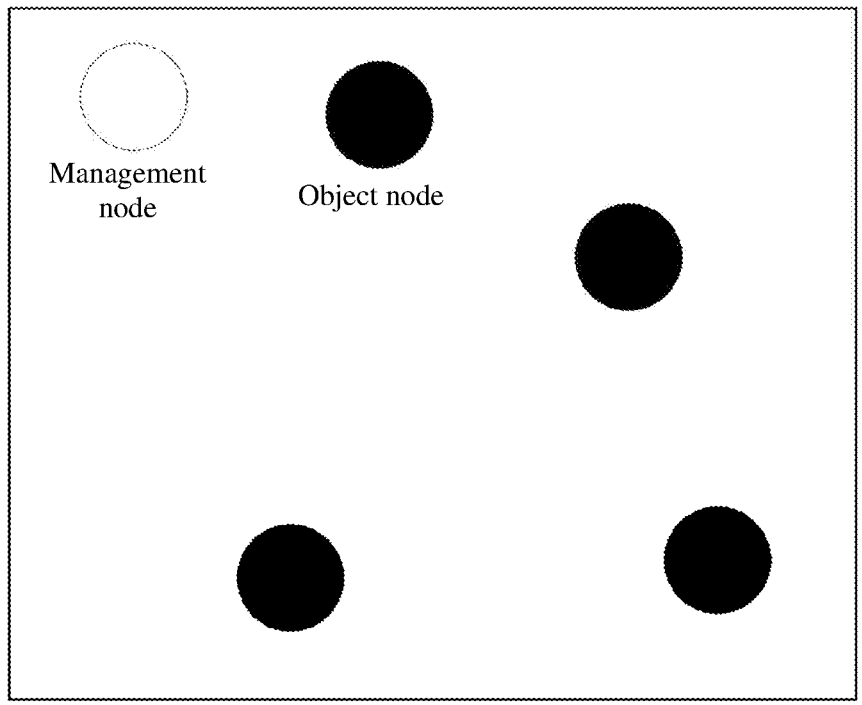
FIG. 5 is a schematic structural diagram of a blockchain-based exchange system for available resource quotas, according to an embodiment of the specification.

Based on the blockchain-based exchange method for available resource quotas shown in FIG. 1, an embodiment of the specification further provides an exchange system for available resource quotas. As shown in FIG. 5, the system includes: a management node (a hollow circle) and several object nodes (solid circles), where each object node performs copyright use transactions by using virtual resources issued by the management node as transaction media; and the management node selects several object nodes as target nodes according to a selection rule; determines, for each target node, available resource quotas exchanged to the target node, the available resource quotas exchanged to the target node being used for determining earning increments corresponding to the target node; determines virtual resources of the available resource quotas as virtual resource decrements corresponding to the target node; and constructs a quota exchange transaction including the determined virtual resource decrements corresponding to the target node, and publishes the quota exchange transaction to a blockchain.

Figure 6:
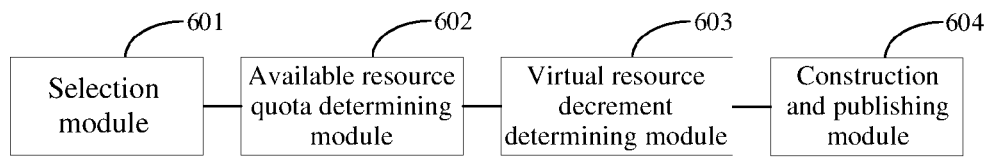
FIG. 6 is a schematic structural diagram of a blockchain-based set exchange apparatus for available resource quotas, according to an embodiment of the specification.

Based on the blockchain-based set exchange method for available resource quotas shown in FIG. 2, an embodiment of the specification further provides a blockchain-based set exchange apparatus for available resource quotas. As shown in FIG. 6, a blockchain network includes the apparatus and several object nodes, each object node performing copyright use transactions by using virtual resources issued by the apparatus as transaction media, and the apparatus includes: a selection module 601, configured to select several object nodes and/or a set of several object nodes as target objects according to a selection rule, each set of object nodes consisting of more than one object node; an available resource quota determining module 602, configured to determine, for each target object, available resource quotas exchanged to each object node in the target object if the target object is a set of object nodes, for each object node in the target object, the available resource quotas exchanged to the object node being used for determining earning increments corresponding to the object node; a virtual resource decrement determining module 603, configured to determine, for each object node in the target object, virtual resources of the available resource quotas corresponding to the object node as virtual resource decrements corresponding to the object node; and a construction and publishing module 604, configured to construct a quota exchange transaction including the determined virtual resource decrements corresponding to the object node, and publish the quota exchange transaction to a blockchain.

The available resource quota determining module 602 is configured to: determine available resource quotas exchanged to the target object; obtain an earning ratio corresponding to each object node in the target object; and for each object node in the target object, obtain, according to the earning ratio corresponding to the object node and the available resource quotas exchanged to the target object, the available resource quotas exchanged to the object node.

The available resource quota determining module 602 is configured to determine an amount of designated remaining virtual resources corresponding to the target object as the available resource quotas exchanged to the target object. The amount of designated remaining virtual resources corresponding to the target object is a sum of amounts of designated remaining virtual resources corresponding to the object nodes in the target object. For each object node, the amount of designated remaining virtual resources corresponding to the object node is an amount that is preassigned by a user corresponding to the object node and that is of at least some remaining virtual resources corresponding to the object node.

The available resource quota determining module 602 is configured to determine, for each target object, a minimum amount of remaining virtual resources as the available resource quotas exchanged to the target object.

The minimum amount of remaining virtual resources is determined in the following manner: a minimum amount of designated remaining virtual resources is determined from the amounts of designated remaining virtual resources respectively corresponding to the target objects; and an amount not greater than the minimum amount of designated remaining virtual resources is designated as the minimum amount of remaining virtual resources.

The available resource quota determining module 602 is configured to calculate, for each object node in the target object, a ratio of the amount of designated remaining virtual resources corresponding to the object node to the amount of designated remaining virtual resources corresponding to the target object, as an earning ratio corresponding to the object node.

In some embodiments, the various modules of the apparatus of FIG. 6 may be implemented as software instructions or a combination of software and hardware. For example, the apparatus of FIG. 6 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the apparatus of FIG. 6 may include a server, a mobile phone, a tablet computer, a PC, a laptop computer, another computing device, or a combination of one or more of these computing devices.

In some embodiments, a system comprises one or more processors and one or more non-transitory computer-readable storage media storing instructions executable by the one or more processors, wherein execution of the instructions causes the one or more processors to perform operations comprising: selecting, at a management node of a blockchain network, a set of object nodes as a target object according to a selection rule; determining, at the management node for each object node in the target object, a resource quota; determining, at the management node for the each object node, virtual resources corresponding to the resource quota as virtual resource decrements corresponding to the object node; and constructing, at the management node, a quota exchange transaction comprising the determined virtual resource decrements corresponding to the object node, and adding the quota exchange transaction to a blockchain on the blockchain network.

Figure 7:
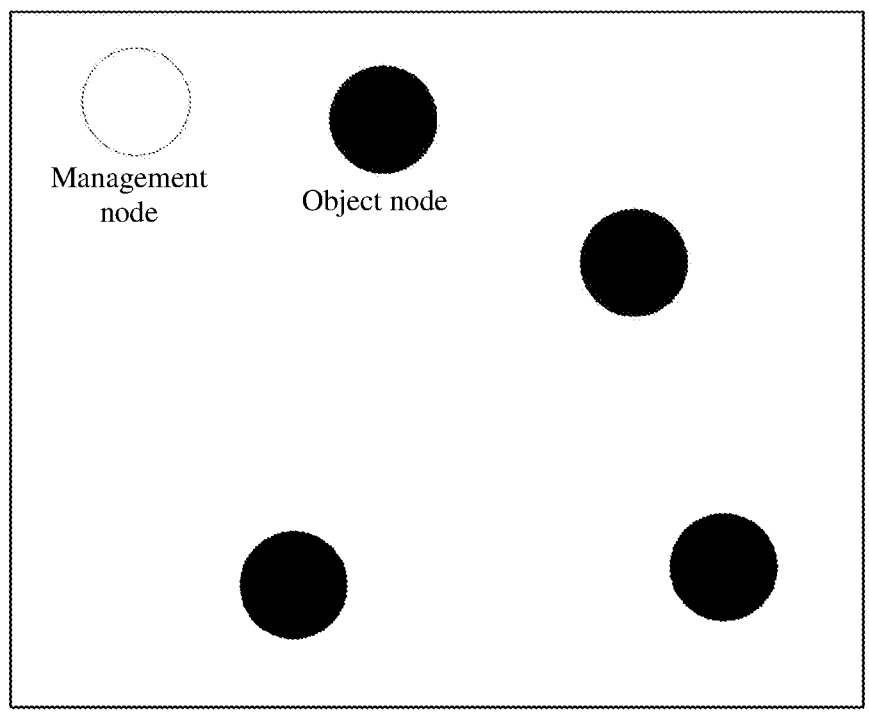
FIG. 7 is a schematic structural diagram of a blockchain-based set exchange system for available resource quotas, according to an embodiment of the specification.

Based on the blockchain-based set exchange method for available resource quotas shown in FIG. 2, an embodiment of the specification further provides a set exchange system for available resource quotas. As shown in FIG. 7, the system includes: a management node (a hollow circle) and several object nodes (solid circles), where each object node performs copyright use transactions by using virtual resources issued by the management node as transaction media; and the management node selects several object nodes and/or a set of several object nodes as target objects according to a selection rule, each set of object nodes consisting of more than one object node; determines, for each target object, available resource quotas exchanged to each object node in the target object if the target object is a set of object nodes, for each object node in the target object, the available resource quotas exchanged to the object node being used for determining earning increments corresponding to the object node; determines, for each object node in the target object, virtual resources of the available resource quotas corresponding to the object node as virtual resource decrements corresponding to the object node; and constructs a quota exchange transaction including the determined virtual resource decrements corresponding to the object node, and publishes the quota exchange transactions to a blockchain.

Figure 8:
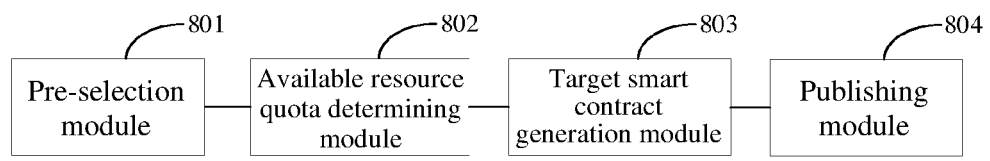
FIG. 8 is a schematic structural diagram of a blockchain-based apparatus for pre-exchanging available resource quotas, according to an embodiment of the specification.

Based on the blockchain-based method for pre-exchanging available resource quotas shown in FIG. 3, an embodiment of the specification further provides a blockchain-based apparatus for pre-exchanging available resource quotas. As shown in FIG. 8, a blockchain network includes the apparatus node and several object nodes, each object node performing copyright use transactions by using virtual resources issued by the apparatus as transaction media, and the apparatus includes: a pre-selection module 801, configured to select several object nodes as pre-exchange nodes according to a pre-selection rule; an available resource quota determining module 802, configured to determine, for each pre-exchange node, available resource quotas pre-exchanged to the pre-exchange node, the available resource quotas pre-exchanged to the pre-exchange node being used for determining earning increments corresponding to the pre-exchange node; a target smart contract generation module 803, configured to generate a target smart contract based on the available resource quotas, the target smart contract being used to deduct virtual resources of the available resource quotas from future increments of virtual resources corresponding to the pre-exchange node, and the future increments of the virtual resources corresponding to the pre-exchange node being virtual resource increments that are to be stored in a blockchain and that correspond to the pre-exchange node; and a publishing module 804, configured to publish the target smart contract to the blockchain.

The pre-selection module 801 is configured to: determine, for each object node, whether an amount of virtual resource increments corresponding to the object node in each of a plurality of first cycles is greater than a designated amount; and if yes, determine the object node as the pre-exchange node; otherwise, reject to determine the object node as the pre-exchange node.

The pre-selection module 801 is configured to determine whether an amount of virtual resource increments that correspond to the object node and that are generated based on copyright use transactions in each of a plurality of first cycles is greater than the designated amount.

The available resource quota determining module is configured to determine, according to an amount of virtual resource increments corresponding to the pre-exchange node in each of a plurality of second cycles, available resource quotas pre-exchanged to the pre-exchange node.

The target smart contract is further used to deduct virtual resources of an interest amount from the future increments of the virtual resources corresponding to the pre-exchange node. The interest amount is determined according to an amount of virtual resource increments corresponding to the pre-exchange node in each of a plurality of third cycles.

In some embodiments, the various modules of the apparatus of FIG. 8 may be implemented as software instructions or a combination of software and hardware. For example, the apparatus of FIG. 8 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the apparatus of FIG. 8 may include a server, a mobile phone, a tablet computer, a PC, a laptop computer, another computing device, or a combination of one or more of these computing devices.

Figure 9:
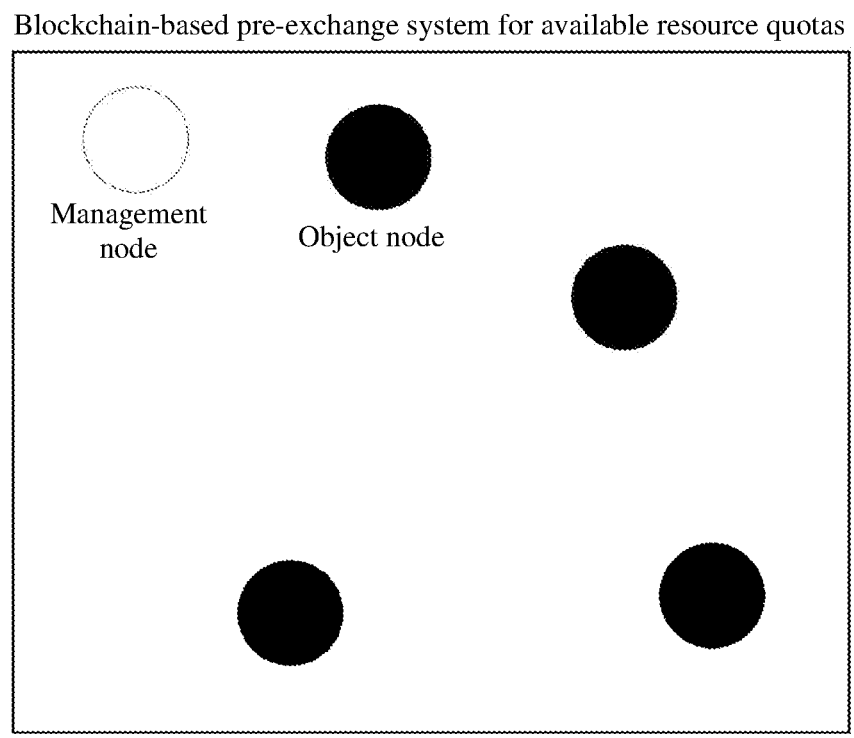
FIG. 9 is a schematic structural diagram of a blockchain-based system for pre-exchanging available resource quotas, according to an embodiment of the specification.

Based on the blockchain-based method for pre-exchanging available resource quotas shown in FIG. 3, an embodiment of the specification further provides a blockchain-based system for pre-exchanging available resource quotas. As shown in FIG. 9, the system includes: a management node (a hollow circle) and several object nodes (solid circles), where each object node performs copyright use transactions by using virtual resources issued by the management node as transaction media; and the management node selects several object nodes as pre-exchange nodes according to a pre-selection rule; determines, for each pre-exchange node, available resource quotas pre-exchanged to the pre-exchange node, the available resource quotas pre-exchanged to the pre-exchange node being used for determining earning increments corresponding to the target node; generates a target smart contract based on the available resource quotas, the target smart contract being used to deduct virtual resources of the available resource quotas from future increments of virtual resources corresponding to the pre-exchange node, and the future increments of the virtual resources corresponding to the pre-exchange node being virtual resource increments that are to be stored in a blockchain and that correspond to the pre-exchange node; and publishes the target smart contract to a blockchain.

An embodiment of the specification further provides a computer device, including at least a memory, a processor, and a computer program stored in the memory and runnable on the processor. When the processor executes the program, the function of the method in FIG. 1 or FIG. 2 or FIG. 3 is implemented.

Figure 10:
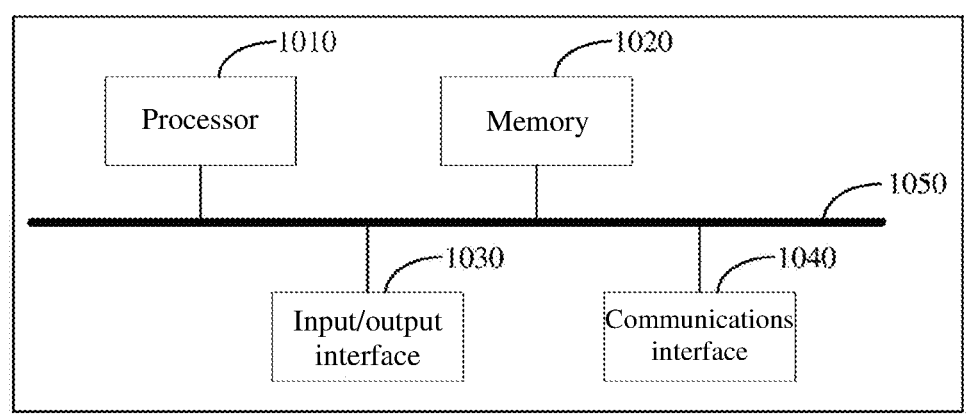
FIG. 10 is a schematic structural diagram of a computer device configured for a method according to an embodiment of the specification.

FIG. 10 is a schematic diagram of a more detailed hardware structure of a computing device, according to an embodiment of the specification. The device may include a processor 1010, a memory 1020, an input/output interface 1030, a communications interface 1040, and a bus 1050. Communication connection between the processor 1010, the memory 1020, the input/output interface 1030, and the communications interface 1040 in the device is implemented through the bus 1050.

The processor 1010 may be implemented by a general-purpose central processing unit (CPU), a microprocessor, an application-specific integrated circuit (ASIC), or one or more integrated circuits to execute a related program, to implement the technical solutions provided in the embodiments of the specification.

The memory 1020 may be implemented in a form such as a read-only memory (ROM), a random access memory (RAM), a static storage device, or a dynamic storage device. The memory 1020 may store an operating system and other application programs. When the technical solutions provided in the embodiments of the specification are implemented by software or firmware, related program code is stored in the memory 1020 and is invoked and executed by the processor 1010.

The input/output interface 1030 is configured to connect to an input/output module to input and output information. The input/output module may be configured in the device (not shown in the figure) as a component, or may be externally connected to the device to provide corresponding functions. The input device may include a keyboard, a mouse, a touchscreen, a microphone, various sensors, and the like, and the output device may include a display, a speaker, a vibrator, an indicator light, and the like.

The communications interface 1040 is configured to connect to a communications module (not shown in the figure) to implement communication and interaction between the device and other devices. The communications module may implement communication in a wired manner (for example, a universal serial bus (USB) or a network cable), and may also implement communication in a wireless manner (for example, a mobile network, wireless fidelity (Wi-Fi), or Bluetooth).

The bus 1050 includes a channel, and transmits information between the components (such as the processor 1010, the memory 1020, the input/output interface 1030, and the communications interface 1040) of the device.

Although only the processor 1010, the memory 1020, the input/output interface 1030, the communications interface 1040, and the bus 1050 are shown for the above device, in a specific implementation process, the device may further include other components necessary for implementing normal operation. In addition, a person skilled in the art may understand that the above device may alternatively include only components necessary to implement the solutions in the embodiments of the specification and does not necessarily include all the components shown in the drawings.

An embodiment of the specification further provides a blockchain-based set exchange system for available resource quotas (e.g., a blockchain-based crowd-funding system). As shown in FIG. 8, the blockchain-based set exchange system for available resource quotas includes a plurality of blockchain nodes, and for each blockchain node, the blockchain node has the function of implementing the method in at least one of the second, third, fifth, and sixth aspects of Summary.

An embodiment of the specification further provides a computer-readable storage medium, storing a computer program. When the program is executed by a processor, functions of the method in at least one of the second, third, fifth, and sixth aspects of Summary are implemented.

The computer readable medium includes persistent and non-persistent media and removable and non-removable media that can store information by using any method or technology. The information may be a computer readable instruction, a data structure, a module of a program, or other data. Examples of computer storage media include but are not limited to a phase change memory (PRAM), a static RAM (SRAM), a dynamic RAM (DRAM), another type of RAM, a ROM, an electrically erasable programmable ROM (EEPROM), a flash memory or another memory technology, a compact disc ROM (CD-ROM), a digital versatile disc (DVD) or another optical storage, a cassette magnetic tape, and a tape and disk storage or another magnetic storage device or any other non-transmission media, which may be configured to store information that a computing device can access. Based on the definition herein, the computer-readable medium does not include transitory computer readable media (transitory media), such as a modulated data signal and a carrier.

It may be learned from the description of the foregoing implementations that, a person skilled in the art may clearly understand that the embodiments of the specification may be implemented by using software in addition to a necessary universal hardware platform. Based on such an understanding, the technical solutions in the embodiments of the specification essentially, or the part contributing to the existing technologies may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of the specification.

The system, the method, the module, or the unit described in the foregoing embodiments can be implemented by a computer chip or an entity or implemented by a product having a specific function. A typical implementation device is a computer, and a specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination of several of these devices.

The embodiments in the specification are all described in a progressive manner, for same or similar parts, refer to the embodiments, and descriptions of each embodiment focus on a difference from other embodiments. Especially, apparatus and device embodiments are basically similar to a method embodiment, and therefore are described briefly. For related parts, refer to partial descriptions in the method embodiment. The method embodiment described above is merely exemplary, and the modules described as separate components may or may not be physically separate. When the solutions in the embodiments of the specification are implemented, the functions of the modules may be implemented in one same piece or a plurality of pieces of software and/or hardware. Some or all modules thereof may be selected based on an actual requirement, to implement an objective of the solution. A person of ordinary skill in the art may understand and implement the objective without creative efforts.

The foregoing is only specific implementations of the embodiments of the specification, and it should be noted that, a person of ordinary skill in the art may further make various improvements and refinements without departing from the principles of the embodiments of the specification. Such improvements and refinements should also fall within the protection scope of the embodiments of the specification.

What is claimed is:

1. A method, comprising:
   issuing, by a management node of a blockchain computer network, virtual resources to a plurality of object nodes through a blockchain as transaction media, wherein the blockchain is on the blockchain computer network;
   performing, by one or more blockchain nodes of the blockchain computer network, consensus verification on a smart contract, wherein the smart contract comprises computer code executable to select a target object, wherein the computer code comprises a selection rule;
   storing, by the one or more blockchain nodes, the smart contract on the blockchain;

selecting, by the management node, a set of object nodes from the plurality of object nodes according to the selection rule by invoking the smart contract stored on the blockchain, wherein the target object comprises the set of object nodes;

determining, by the management node for each of the object nodes, an amount of designated remaining virtual resources of the issued virtual resources corresponding to the each object node stored on the blockchain;

determining, by the management node for the target object, an amount of designated remaining virtual resources by accumulating the amounts of designated remaining virtual resources corresponding to each of the object nodes in the target object;

determining, by the management node for the target object, a resource quota based on the amount of designated remaining virtual resources corresponding to the target object;

determining, by the management node for each of the object nodes, virtual resource decrements corresponding to each of the object nodes based on the resource quota for the target object;

constructing, by the management node, a quota exchange transaction comprising the determined virtual resource decrements corresponding to each of the object nodes, sending, by the management node, the quota exchange transaction to the one or more blockchain nodes of the blockchain computer network;

performing, by the one or more blockchain nodes, consensus verification on the quota exchange transaction;

determining, by the one or more blockchain nodes, that the consensus verification on the quota exchange transaction succeeds; and based on the determination that the consensus verification on the quota exchange transaction succeeds, deducting, by one or more blockchain nodes of the blockchain network, the determined virtual resource decrements by executing the quota exchange transaction.

2. The method according to claim 1, wherein determining the resource quota comprises:
determining a total resource quota for the set of object nodes;
obtaining an earning ratio corresponding to each of the object nodes in the target object; and
obtaining, according to the earning ratio, the resource quota for each of the object nodes in the target object.

3. The method according to claim 2, wherein determining the resource quota comprises:
determining the amount of designated remaining virtual resources corresponding to the target object as the total resource quota;
the amount of designated remaining virtual resources corresponding to the target object is a sum of amounts of designated remaining virtual resources corresponding to the object nodes in the target object; and
for each of the object nodes, the amount of designated remaining virtual resources is preassigned by a user corresponding to each of the object nodes.

4. The method according to claim 2, wherein obtaining the earning ratio comprises:
determining, for each of the object nodes, a ratio of the amount of designated remaining virtual resources corresponding to each of the object nodes to the amount of designated remaining virtual resources corresponding to the target object, as the earning ratio corresponding to the each object node.

5. The method according to claim 1, wherein:
each of the object nodes are configured to receive virtual resource increments through copyright use transactions.

6. The method according to claim 1, wherein:
the selection rule comprises a competitiveness representation value algorithm;
selecting the set of object nodes as the target object according to the selection rule comprises:
determining, by the management node for each of the object nodes, a competitiveness representation value by using the competitiveness representation value algorithm, and
selecting a preset quantity of object nodes as the target object according to the competitiveness representation value respectively corresponding to each of the object nodes; and
for each of the object nodes, a larger competitiveness representation value increases a chance of being selected.

7. One or more non-transitory computer-readable storage media storing instructions executable by one or more processors, wherein execution of the instructions causes the one or more processors to perform operations comprising:
issuing virtual resources to a plurality of object nodes through a blockchain as transaction media;
performing consensus verification on a smart contract, wherein the smart contract comprises computer code executable to select a target object, wherein the computer code comprises a selection rule;
storing the smart contract on the blockchain;
selecting a set of object nodes from the plurality of object nodes according to the selection rule by invoking the smart contract stored on the blockchain, wherein the target object comprises the set of object nodes;
determining, for each of the object nodes, an amount of designated remaining virtual resources of the issued virtual resources corresponding to the each object node stored on the blockchain;
determining, for the target object, an amount of designated remaining virtual resources by accumulating the amounts of designated remaining virtual resources corresponding to each of the object nodes in the target object;
determining, for the target object, a resource quota based on the amount of designated remaining virtual resources corresponding to the target object;
determining, for each of the object nodes, virtual resource decrements corresponding to each of the object nodes based on the resource quota for the target object;
constructing a quota exchange transaction comprising the determined virtual resource decrements corresponding to each of the object nodes,
sending the quota exchange transaction to the one or more blockchain nodes;
performing consensus verification on the quota exchange transaction;
determining that the consensus verification on the quota exchange transaction succeeds; and
based on the determination that the consensus verification on the quota exchange transaction succeeds, deducting the determined virtual resource decrements by executing the quota exchange transaction.

8. The one or more non-transitory computer-readable storage media according to claim 7, wherein determining the resource quota comprises:

determining a total resource quota for the set of object nodes;
obtaining an earning ratio corresponding to each of the object nodes in the target object; and
obtaining, according to the earning ratio, the resource quota for each of the object nodes in the target object.

9. The one or more non-transitory computer-readable storage media according to claim 8, wherein determining the resource quota comprises:
determining the amount of designated remaining virtual resources corresponding to the target object as the total resource quota;
the amount of designated remaining virtual resources corresponding to the target object is a sum of amounts of designated remaining virtual resources corresponding to the object nodes in the target object; and
for each of the object nodes, the amount of designated remaining virtual resources is preassigned by a user corresponding to each of the object nodes.

10. The one or more non-transitory computer-readable storage media according to claim 8, wherein obtaining the earning ratio comprises:
determining, for each of the object nodes, a ratio of the amount of designated remaining virtual resources corresponding to each of the object nodes to the amount of designated remaining virtual resources corresponding to the target object, as the earning ratio corresponding to the each object node.

11. The one or more non-transitory computer-readable storage media according to claim 7, wherein:
each of the object nodes are configured to receive virtual resource increments through copyright use transactions.

12. The one or more non-transitory computer-readable storage media according to claim 7, wherein:
the selection rule comprises a competitiveness representation value algorithm;
selecting the set of object nodes as the target object according to the selection rule comprises:
determining, for each of the object nodes, a competitiveness representation value by using the competitiveness representation value algorithm, and
selecting a preset quantity of object nodes as the target object according to the competitiveness representation value respectively corresponding to each of the object nodes; and
for each of the object nodes, a larger competitiveness representation value increases a chance of being selected.

13. A system, comprising one or more processors and one or more non-transitory computer-readable storage media storing instructions executable by the one or more processors, wherein execution of the instructions causes the one or more processors to perform operations comprising:
issuing virtual resources to a plurality of object nodes through a blockchain as transaction media;
performing consensus verification on a smart contract, wherein the smart contract comprises computer code executable to select a target object, wherein the computer code comprises a selection rule;
storing the smart contract on the blockchain;
selecting a set of object nodes from the plurality of object nodes according to the selection rule by invoking the smart contract stored on the blockchain, wherein the target object comprises the set of object nodes;
determining, for each of the object nodes, an amount of designated remaining virtual resources of the issued virtual resources corresponding to the each object node stored on the blockchain;
determining, by the management node for the target object, an amount of designated remaining virtual resources by accumulating the amounts of designated remaining virtual resources corresponding to each of the object nodes in the target object;
determining, for the target object, a resource quota based on the amount of designated remaining virtual resources corresponding to the target object;
determining, for each of the object nodes, virtual resource decrements corresponding to each of the object nodes based on the resource quota for the target object;
constructing a quota exchange transaction comprising the determined virtual resource decrements corresponding to each of the object nodes,
sending the quota exchange transaction to the one or more blockchain nodes;
performing consensus verification on the quota exchange transaction;
determining that the consensus verification on the quota exchange transaction succeeds; and
based on the determination that the consensus verification on the quota exchange transaction succeeds, deducting the determined virtual resource decrements by executing the quota exchange transaction.

14. The system according to claim 13, wherein determining the resource quota comprises:
determining a total resource quota for the set of object nodes;
obtaining an earning ratio corresponding to each of the object nodes in the target object; and
obtaining, according to the earning ratio, the resource quota for each of the object nodes in the target object.

15. The system according to claim 14, wherein determining the resource quota comprises:
determining the amount of designated remaining virtual resources corresponding to the target object as the total resource quota;
the amount of designated remaining virtual resources corresponding to the target object is a sum of amounts of designated remaining virtual resources corresponding to the object nodes in the target object; and
for each of the object nodes, the amount of designated remaining virtual resources is preassigned by a user corresponding to each of the object nodes.

16. The system according to claim 14, wherein obtaining the earning ratio comprises:
determining, for each of the object nodes, a ratio of the amount of designated remaining virtual resources corresponding to each of the object nodes to the amount of designated remaining virtual resources corresponding to the target object, as the earning ratio corresponding to the each object node.

17. The system according to claim 13, wherein:
the selection rule comprises a competitiveness representation value algorithm;
selecting the set of object nodes as the target object according to the selection rule comprises:
determining, for each of the object nodes, a competitiveness representation value by using the competitiveness representation value algorithm, and selecting a preset quantity of object nodes as the target object according to the competitiveness representation value respectively corresponding to each of the object nodes; and for each of the object nodes, a larger competitiveness representation value increases a chance of being selected.

\* \* \* \* \*